United States Patent [19]

Hakala et al.

[11] Patent Number: 5,699,677
[45] Date of Patent: Dec. 23, 1997

[54] COMPRESSOR MOUNTED DRAIN PAN UTILIZING POLYURETHANE ADHESIVE

[75] Inventors: Kevin E. Hakala, St. Cloud; Joseph D. Kunkel, Clearwater; Glenn L. Johnson, Sauk Rapids, all of Minn.

[73] Assignee: White Consolidated Industries, Inc., Cleveland, Ohio

[21] Appl. No.: 745,044

[22] Filed: Nov. 7, 1996

[51] Int. Cl.⁶ ............................................. F25D 19/00
[52] U.S. Cl. ............................................. 62/291
[58] Field of Search ........................ 62/285, 288, 291; 248/638

[56] References Cited

U.S. PATENT DOCUMENTS

| | | | |
|---|---|---|---|
| 2,903,863 | 9/1959 | Coning | 62/291 |
| 3,216,217 | 11/1965 | Kesling | 62/289 |
| 3,834,176 | 9/1974 | Clarke | 62/276 |
| 3,890,799 | 6/1975 | Sisk, Jr. | 62/215 |
| 4,009,594 | 3/1977 | Swanson | 62/278 |
| 4,074,987 | 2/1978 | Krulewich | 62/128 |
| 4,207,753 | 6/1980 | Shueh et al. | 62/285 |
| 4,269,035 | 5/1981 | Gelbard | 62/155 |
| 4,346,565 | 8/1982 | McCarty | 62/151 |
| 4,461,446 | 7/1984 | Hannibal et al. | 248/634 |
| 4,490,992 | 1/1985 | Chastine | 62/295 |
| 4,497,183 | 2/1985 | Gelbard et al. | 62/295 |
| 4,783,971 | 11/1988 | Alba | 62/291 |
| 4,823,558 | 4/1989 | Kim | 62/272 |
| 4,834,336 | 5/1989 | Shimazaki et al. | 248/666 |
| 4,843,835 | 7/1989 | Goetz et al. | 62/285 |
| 4,995,244 | 2/1991 | Steers et al. | 62/155 |
| 5,154,792 | 10/1992 | Patterson | 156/307.3 |
| 5,271,241 | 12/1993 | Kim | 62/285 |
| 5,389,420 | 2/1995 | Sexti et al. | 428/74 |
| 5,499,514 | 3/1996 | Ho | 62/291 |

*Primary Examiner*—William E. Tapolcai
*Attorney, Agent, or Firm*—Pearne, Gordon, McCoy & Granger LLP

[57] ABSTRACT

Disclosed is a compressor and drain pan assembly utilizing a polyurethane adhesive to secure the drain pan to the compressor housing. The adhesive has an elasticity sufficient to dampen vibrations from the compressor, thereby significantly minimizing undesirable noise.

17 Claims, 2 Drawing Sheets

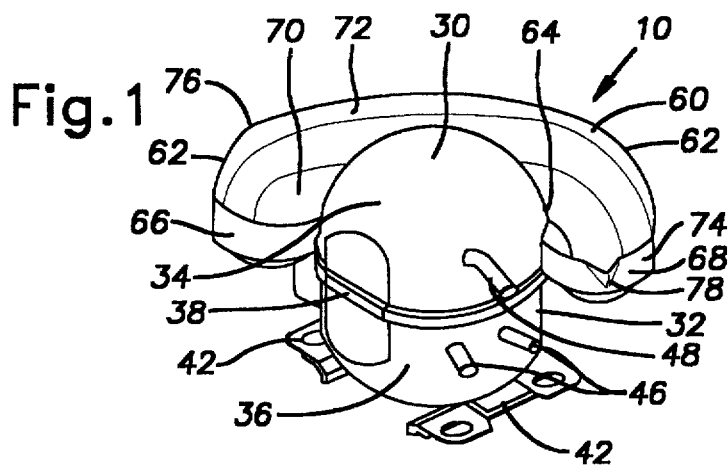
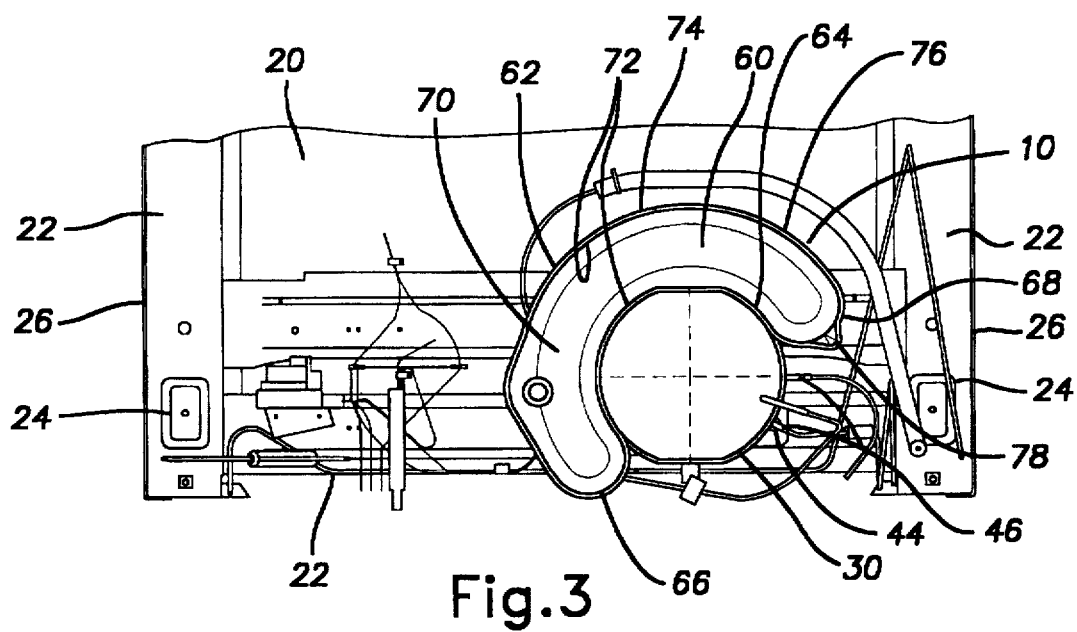
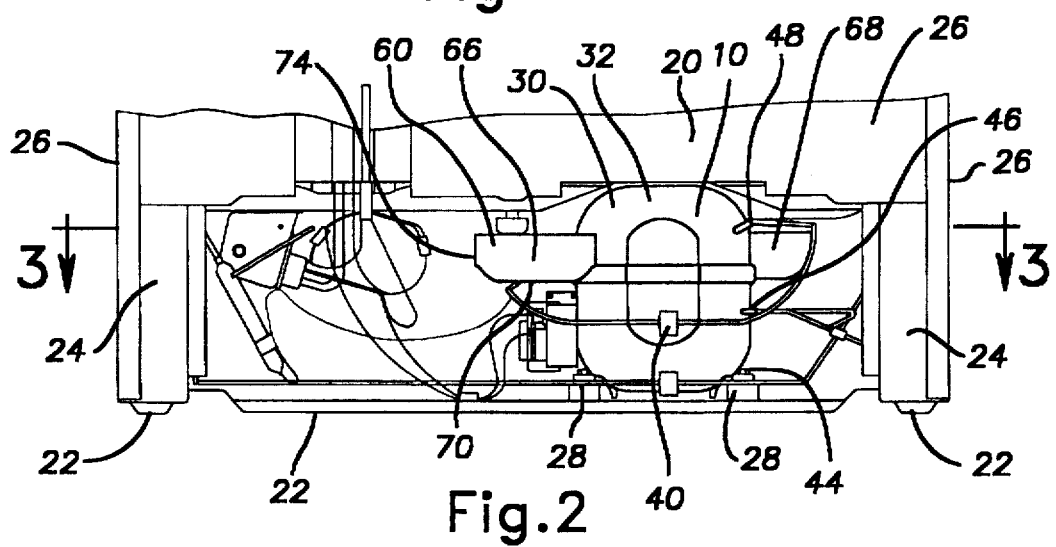

COMPRESSOR MOUNTED DRAIN PAN UTILIZING POLYURETHANE ADHESIVE

FIELD OF THE INVENTION

The present invention relates to a compressor and drain pan assembly. The drain pan is mounted to the compressor housing by a polyurethane adhesive.

BACKGROUND OF THE INVENTION

Reducing the noise emitted by household appliances is becoming increasingly important. Consumers consider the level of noise an important factor in the purchase of a new appliance. Appliances sold in Europe require a label indicating the sound power level emitted by the appliance. Consumers often expect appliance noise levels to be so minimal as to not disturb a telephone conversation in the same room as the appliance.

In refrigerators or freezers, compressors are the main source of noise and vibration. Compressor vibration is typically transferred through the refrigerant lines and cabinet resulting in further noise generation.

Another source of noise is the heater drain pan. During a defrost cycle in a typical freezer unit, the evaporator is heated to melt frost accumulated within the freezer. The water drains out of the freezer cabinet to a drain pan located in the lower portion of the freezer. The water typically evaporates from the drain pan before the next defrost cycle.

The drain pan is typically mounted on the compressor housing in order to promote evaporation of water collected in the drain pan. During operation of the compressor, the compressor housing often reaches temperatures in excess of 100° F.

Plastic drain pans are known in the art, such as those disclosed in U.S. Pat. No. 4,823,558 to Kim and U.S. Pat. No. 4,490,992 to Chastine, both of which are hereby incorporated by reference. However, the poor thermal conductivity properties of plastics as compared to metals have precluded widespread use of plastic drain pans. Accordingly, metal is the primary material of construction. Unfortunately, metal drain pans greatly amplify noise and vibration from the compressor. This is believed to result from the use of metal fasteners and brackets for attaching the drain pan to the compressor. A compressor and adhesively mounted metal drain pan assembly is disclosed in U.S. Pat. No. 4,497,183 to Gelbard et al. which is hereby incorporated by reference. Although satisfactory in many respects, there are several drawbacks associated with such an assembly, namely difficult bonding procedures are employed, occurrence of poor bonding at elevated temperatures, and potential for relatively high levels of noise generation. Thus, there is a need for a compressor and drain pan assembly that is easily and economically assembled, exhibits high bonding strength between compressor and pan, and that is significantly quieter than currently known compressor and drain pan assemblies.

SUMMARY OF THE INVENTION

The present invention achieves all of the foregoing objectives and provides a novel compressor and drain pan assembly. Specifically, the invention provides a compressor and drain pan assembly comprising a drain pan that is adhered to the outer housing of the compressor by a polyurethane adhesive. The drain pan preferably has a C-shaped configuration and is formed from one or more metals. The adhesive is preferably a two component polyurethane adhesive.

The invention also provides a method of reducing the level of noise emitted from a compressor and drain pan assembly. The method involves mounting the drain pan to the compressor housing by use of a polyurethane adhesive.

BRIEF DESCRIPTION OF DRAWINGS

FIG. 1 is a perspective view of a preferred embodiment compressor and drain pan assembly in accordance with the present invention;

FIG. 2 is a partially exposed elevational view of a refrigerator freezer utilizing a preferred embodiment compressor and drain pan assembly;

FIG. 3 is a partial cross-sectional plan view taken along line 3—3 in FIG. 2 of the refrigerator freezer utilizing the preferred embodiment compressor and drain pan assembly;

DESCRIPTION OF THE PREFERRED EMBODIMENTS

Figure 4:
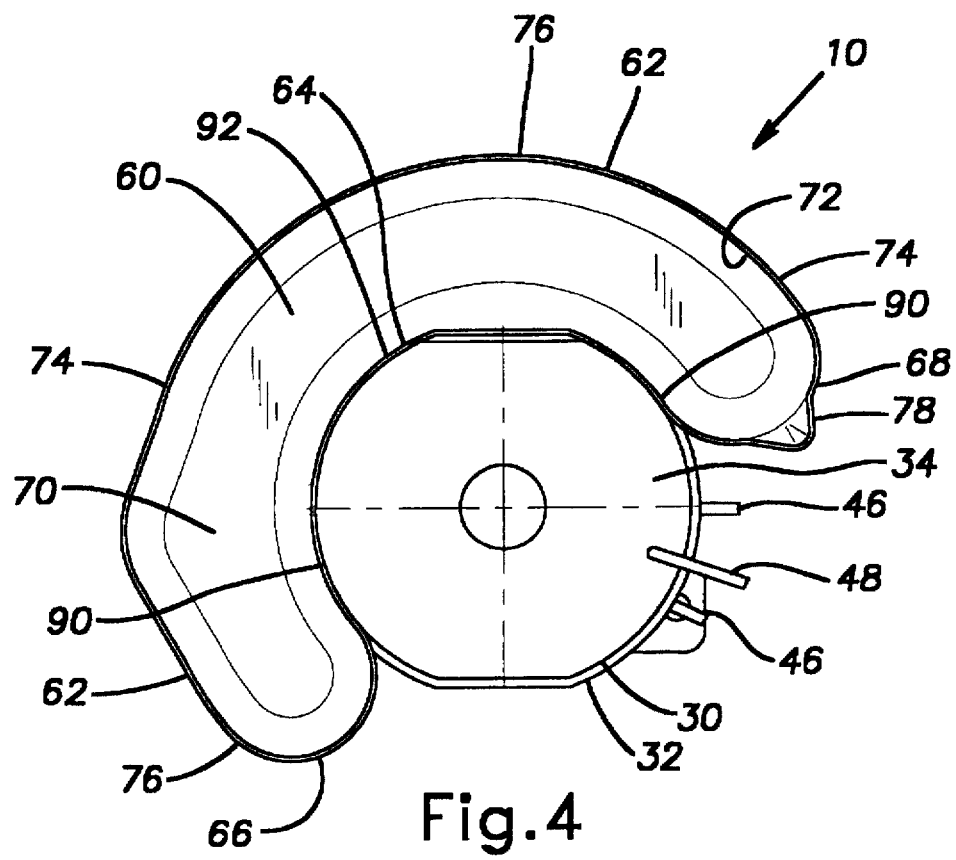
FIG. 4 is a plan view of the preferred embodiment compressor and drain pan assembly illustrated in FIG. 1.
Figure 5:
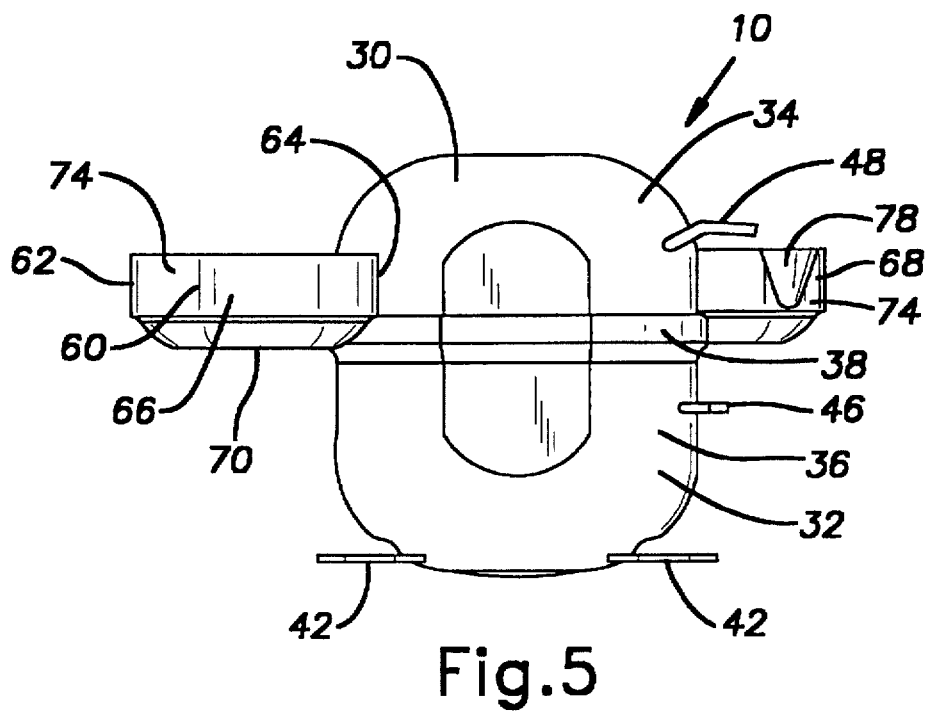
FIG. 5 is an elevational view of the preferred embodiment compressor and drain pan assembly shown in FIG. 1.

Referring to FIGS. 1, 4, and 5, a preferred embodiment compressor and drain pan assembly 10 in accordance with the present invention is illustrated. The preferred embodiment assembly 10 comprises a compressor unit 30 having a housing 32 providing an upper hemispherical cover 34 and a lower cylindrical basket 36. The compressor housing 32 is typically formed from cold rolled steel with an electrodeposited paint coating. The housing 32 further provides a sealing ridge assembly 38 extending around the periphery of the housing 32 at which the upper cover 34 and the lower basket 36 sealingly engage each other. The compressor unit 30 further comprises one or more base members 42 having one or more apertures formed therein for receiving fasteners or other mounting hardware described in greater detail below. The compressor 30 further comprises one or more discharge ports 46 at which compressed refrigerant is discharged, and an inlet port 48 at which expanded refrigerant, i.e. the suction line, is received.

The preferred embodiment compressor and drain pan assembly 10 also comprises a drain pan 60 generally having a C-shaped configuration. The drain pan 60 comprises an outer arcuate wall 62, an inner arcuate wall 64, and a first and a second end wall 66 and 68, respectively. The first end wall 66 and the second end wall 68 extend between the outer and inner walls 62 and 64. As illustrated in the accompanying figures, the first and second end walls 66 and 68, respectively, are preferably arcuate and most preferably semi-circular. The drain pan 60 further includes a floor 70 extending between the outer wall 62, the inner wall 64, the first end wall 66, and the second end wall 68. The previously noted walls 62, 64, 66, and 68 and floor 70 define an interior surface 72, and an exterior surface 74. The drain pan 60 provides an upper edge or lip 76 extending along the border between the interior surface 72 and the exterior surface 74. The drain pan 60 also provides a spout 78 defined at one of the end walls 66 or 68.

The drain pan 60 is preferably formed from metal. The metal selected should be relatively inexpensive, sufficiently rigid and durable, and have relatively high thermal conductivity properties. A preferred metal for the drain pan is galvanized steel. It is also preferred to apply a protective coating on the metal drain pan to further protect against the formation of rust or corrosion. A preferred coating is an epoxy base powder paint.

The drain pan 60 is affixed to the housing 32 of the compressor unit 30 by an effective amount of an adhesive 90 disposed between the housing 32 and the exterior surface 74 of the drain pan 60. Preferably, the adhesive 90 is disposed between the exterior surface 74 of the inner wall 64 and the upper cover 34 of the housing 32. Most preferably, the adhesive 90 is in the form of a continuous bead 92 extending along this interface.

The configuration of the drain pan 60 is such that the curvature of the inner arcuate wall 64 is equivalent to the curvature of the compressor housing 32 to which the drain pan 60 is mounted. This configuration increases the surface area of the interface or mounting area between the drain pan 60 and the compressor 30. It is also contemplated to deposit the adhesive at this interface region in the form of a layer. The adhesive layer may extend continuously over the mounting region.

The adhesive is preferably a polyurethane adhesive, and most preferably a two-component polyurethane adhesive. Such adhesives generally comprise a diisocyanate-terminated prepolymer as one component and a polyol and polyamine cross-linking agent and catalyst as the second component. The adhesive may include one or more other ingredients depending upon the particular end use properties desired. It is also preferred that the adhesive have a relatively quick cure time, high bond strength, and not be adversely affected by the operating temperatures of the compressor. An example of a suitable two-component polyurethane adhesive is available from H. B. Fuller under the designation TL-0523. The adhesive selected has an elasticity sufficient to dampen vibrations otherwise transmitted from the compressor to the drain pan, to thereby minimize undesirable noise otherwise emitted from the assembly 10.

FIGS. 2 and 3 illustrate a refrigerator freezer 20 utilizing the preferred embodiment compressor and drain pan assembly 10. The refrigerator freezer 20 includes one or more bottom frame members 22, one or more vertical support members 24, and one or more enclosure panels 26. An appropriate number of compressor supports 28 are provided along the bottom frame members 22 for securing the compressor 30 to those members. The compressor 30 is preferably affixed to the refrigerator freezer bottom frame members 22 by utilizing threaded fasteners such as bolts 44 extending through the apertures provided in the compressor base members 42 and the compressor supports 28. The compressor supports 28 are typically formed from a vibration absorbing or sound dampening material such as an elastomeric or resilient material. One or more compressor tubing supports 40 may be employed to secure such tubing within the enclosure and also to minimize vibration and noise generated by such tubing.

The drain pan 60 and particularly the spout 78 are oriented so that in the event excess water collects in the drain pan, the excess water may flow from the drain pan to other draining provisions provided within the enclosure.

The present invention provides a compressor and drain pan assembly in which the drain pan is adhesively bonded to the compressor housing. The drain pan collects water from melting ice and frost, such as collected in a freezer unit, resulting from heating the evaporator during a defrost cycle. Heat from the compressor housing promotes the evaporation of water collected in the pan. The drain pan is C-shaped and adapted for mounting about a portion of the periphery of a typical refrigerator compressor housing. The drain pan comprises a spout disposed at one end for draining excess water contained in the pan. The pan is formed from metals such as galvanized steel. The pan is adhesively mounted to the compressor housing by a suitable polyurethane adhesive. The adhesive selected has an elasticity sufficient to dampen vibrations from the compressor to the pan, thereby minimizing undesirable noise.

Although the present invention has been described in terms of reducing noise resulting from metal drain pans affixed to compressor housings, it is contemplated that the invention is readily applicable to drain pans formed from materials other than metals, such as for instance, plastics.

While the foregoing details are what is felt to be the preferred embodiments of the present invention, no material limitations to the scope of the claimed invention are intended. Further, features and design alternatives that would be obvious to one of ordinary skill in the art are considered to be incorporated herein. The scope of the invention is set forth and particularly described in the claims herein below.

What is claimed is:

1. A compressor and drain pan assembly comprising:
   a compressor unit, said compressor unit having an outer housing;
   a drain pan adhered to said outer housing; and
   a polyurethane adhesive disposed between said drain pan and said outer housing, said adhesive adhering said drain pan to said housing.

2. The assembly of claim 1 wherein said outer housing of said compressor unit includes an upper hemispherical cover and a lower cylindrical basket.

3. The assembly of claim 1 wherein said drain pan is formed from a metal.

4. The assembly of claim 3 wherein said drain pan is formed from galvanized steel.

5. The assembly of claim 1 wherein said drain pan includes an outer arcuate wall, an inner arcuate wall, a first arcuate end wall extending between said inner wall and said outer wall, and a second arcuate end wall extending between said inner wall and said outer wall.

6. The assembly of claim 5 wherein said drain pan is adhered to said outer housing of said compressor by use of said adhesive disposed between said inner wall and said outer housing of said compressor.

7. The assembly of claim 1 wherein said polyurethane adhesive is a two component polyurethane adhesive.

8. The assembly of claim 7 wherein said first component of said adhesive comprises a diisocyanate-terminated prepolymer, and said second component comprises a polyol and polyamine cross-linking agent and catalyst.

9. A compressor and drain pan assembly comprising:
   a compressor for use in a refrigeration system, said compressor having an outer housing;
   a metal drain pan having (i) an outer arcuate wall having a first end and a second end, (ii) an inner arcuate wall having a first end and a second end, (iii) a first arcuate end wall extending between and adjoining said first end of said outer arcuate wall and said first end of said inner arcuate wall, and (iv) a second arcuate end wall extending between and adjoining said second end of said outer arcuate wall and said second end of said inner arcuate wall; and
   an adhesive disposed between said outer housing of said compressor and said inner arcuate wall of said drain pan, to thereby adhere said drain pan to said compressor.

10. The assembly of claim 9 wherein said drain pan further has (v) a drain spout defined at one of said first end wall and said second end wall.

11. The assembly of claim 9 wherein said first end wall and said second end wall are semi-circular.

12. The assembly of claim 9 wherein said adhesive is a polyurethane adhesive.

13. The assembly of claim 12 wherein said polyurethane adhesive is a two component polyurethane adhesive.

14. The assembly of claim 13 wherein said two component polyurethane adhesive comprises a first component consisting essentially of a diisocyanate-terminated prepolymer, and a second component consisting essentially of a polyol and polyamine cross-linking agent and catalyst.

15. A method for reducing the level of noise emitted from a compressor and metal drain pan to be mounted upon said compressor, said method comprising: mounting said drain pan on said compressor by depositing an effective amount of a polyurethane adhesive between and in contact with said drain pan and said compressor, followed by curing said adhesive.

16. The method of claim 15 wherein said polyurethane adhesive is a two component polyurethane adhesive.

17. The method of claim 16 wherein said polyurethane adhesive comprises a first component consisting essentially of a diisocyanate-terminated prepolymer, and said second component comprises a polyol and polyamine cross-linking agent and catalyst.

* * * * *